Jan. 15, 1929.　　　　　　　　　　　　　　　　　　1,699,019
C. H. QUINN
ELECTRICAL CONTROL APPARATUS
Filed Dec. 1, 1924
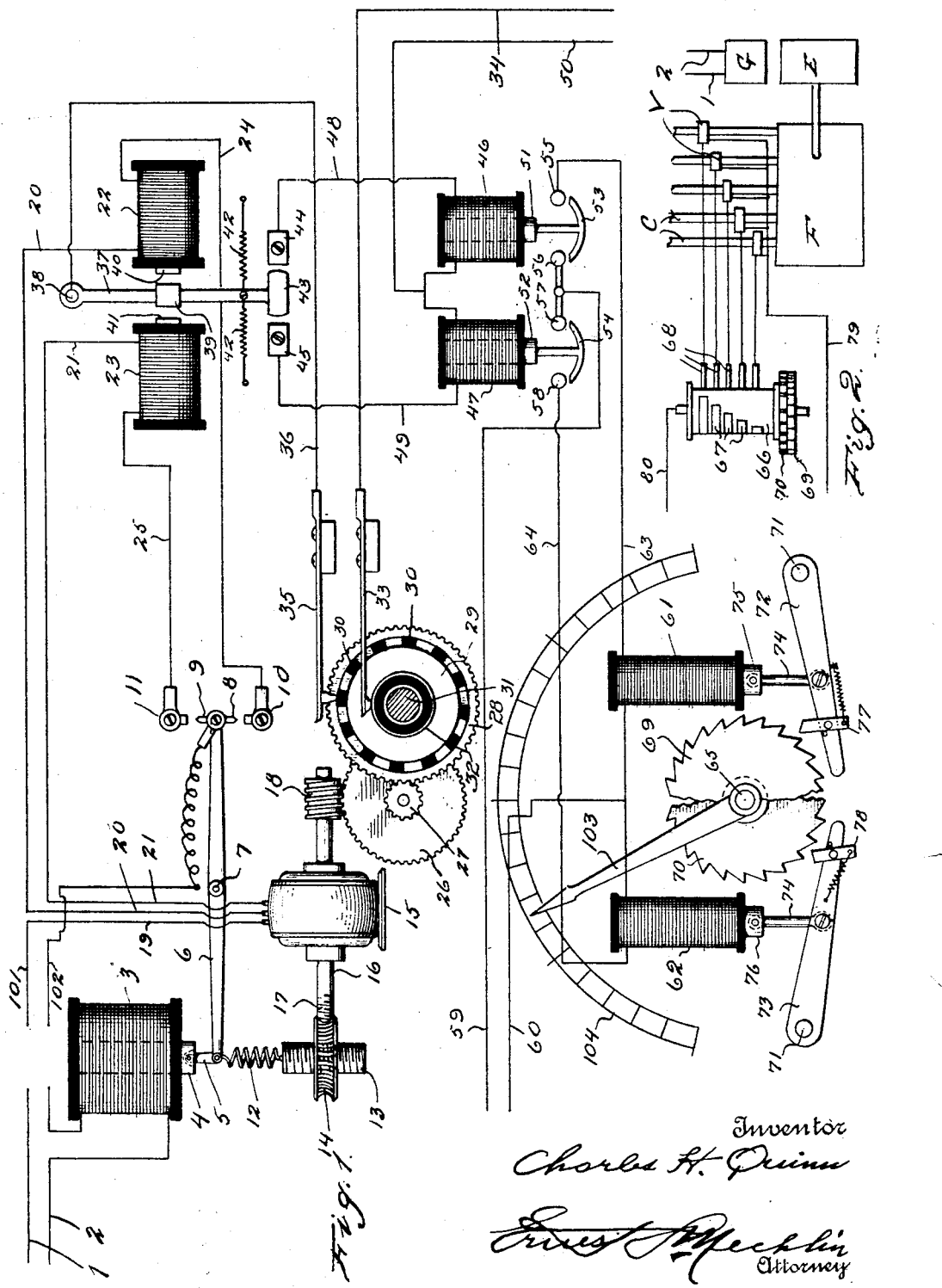

Patented Jan. 15, 1929.

1,699,019

UNITED STATES PATENT OFFICE.

CHARLES H. QUINN, OF SAN FRANCISCO, CALIFORNIA.

ELECTRICAL CONTROL APPARATUS.

Application filed December 1, 1924. Serial No. 753,306.

The invention relates to automatic electrical control devices for the prime movers in dynamo electric plants and to the automatic electrical control of the heat generated in furnaces used under boilers and elsewhere.

The object of the invention, broadly stated, is to provide an automatic apparatus whereby the necessary heat required by a prime mover in a power plant may at all times be provided to insure the operation of the prime mover at its normal speed under different load conditions.

The object of the invention, more particularly stated, is to provide an electro-magnetically operated mechanism or apparatus actuated by variations in the current under different load conditions for moving a circuit control device which may be used in association with the furnace of the power plant for controlling the opening or closing of burners or for regulating the feed of liquid, pulverized or other fuel thereto so as to regulate the power used for driving the engine or engines operating the current generator or generators.

Yet another object of the invention is the provision of electro-magnetic means in circuit with the main power lines or connected with the bus-bars of the station and responsive to variations in the current whereby to actuate control means for an independent circuit acting to energize electro-magnetic means for controlling still another independent circuit or plurality of branch circuits which in turn act to regulate the steam producing equipment and the prime mover.

Another object of the invention is to provide electro-magnetic means in circuit with the main power line or bus-bar, such means being responsive to variations in the current in the bus-bar and to actuate control means for an independent circuit acting to energize electro-magnetic means for indicating at some remote location the approximate current carried in the main station bus-bar.

As an illustration of the utility and adaptability of the present apparatus or mechanism, reference may be made to my co-pending application, filed Dec. 16, 1924, Serial No. 756,320, responsive furnace control means, which discloses a prime mover embodying or involving a battery of fuel feeding devices, any number of which may be thrown into action by the employment of control means such as that illustrated in the present instance, though it is obvious that the mechanism constituting the subject-matter of this invention is in no way limited to use in connection with the structure disclosed in the above mentioned application, the reference being merely for illustrative purposes.

With the above and other objects and advantages in view, a preferred embodiment of the invention consists in or comprises the structural features and the arrangement of parts to be hereinafter described and claimed, and illustrated in the accompanying drawings, though it should be understood that the right is reserved to make all such changes as will widen the field of usefulness, provided such variations constitute no departure from the claims hereunto appended.

In the drawings:

Figure 1 is a diagrammatic view and assembly of the fundamental parts which illustrate the principle of the apparatus used in the invention and show all parts in the neutral or intermediate position and also illustrates the complete circuit arrangement.

Figure 2 is a diagrammatic view of a circuit control device operable by the mechanism and adapted for regulating the prime mover.

Referring more particularly to the drawings, the numerals 1 and 2 designate the power lines or the bus-bars of the station. The numerals 101 and 102 represent the independent source of power actuating the motor 15 and its associated circuits. The numeral 3 indicates a solenoid which has its winding connected with the conductors 1 and 2 and which includes a movable core 4 pivotally connected by a link 5 or the like with one end of an arm 6 pivoted intermediate its ends, as at 7, and carrying oppositely extending contacts 8 and 9 adapted to be brought into engagement with stationary contacts 10 and 11, respectively, under certain circumstances, as will be explained. Connected with the first mentioned end of the arm 6, and consequently with the core 4, is a spring 12 connected, in turn, with a screw 13 having threaded engagement within a worm-wheel 14.

The apparatus further includes an electric motor 15 of any ordinary or preferred type having its shaft 16 threaded at one end to define a worm 17 meshing with the wormwheel 14, and having its other end carrying a worm 18.

The motor 15 is of the reversible type and one of its terminals is connected by a conductor 19 with wire 101, while its other terminals are connected with conductors 20 and 21 connected with the terminals of electro-magnets 22 and 23, respectively. The other terminals of these magnets are connected by conductors 24 and 25, respectively, with the contacts 10 and 11. It will be seen that by this means the motor will be energized to operate in one direction or the other, depending upon whether the contact 10 or 11 is engaged by the contact 8 or 9.

The spring 12 and the pull of the solenoid 3 are so related that there is normally a balanced condition maintaining the arm 6 in the intermediate position shown. Obviously, variations in the current flow through the conductors 1 and 2 will result in a corresponding variation in the magnetic pull of the solenoid 3 which will result in movement of the core 4 and consequent swinging of the arm 6. When the magnetic strength increases, the core will be drawn into the solenoid and the arm 6 will swing in such a way that the contact 8 will engage the contact 10, thus closing the circuit through the electro-magnet 22, through the conductor 20, and the motor for rotating the motor in such a direction that the screw 17 on its shaft will turn the worm-wheel 14 in such a direction as to move the screw 13 away from the solenoid 3 and increase the tension of the spring 12 so that the arm 6 will be restored to its neutral or intermediate position, whereupon the motor ceases to be energized. In case of a decrease in the magnetic strength of the solenoid 3, the tension of the spring 12 exceeds the pull on the core 4 and the arm 6 is moved in the reverse direction, the contact 9 engaging the contact 11 and closing the circuit through the magnet 23, conductor 21 and the motor for causing the motor to operate in the reverse direction so that the screw 17 on its shaft will turn the worm-wheel 14 in a direction opposite to that above indicated for moving the screw 13 toward the solenoid 3 and reducing the tension of the spring 12 so that the arm 6 may return to neutral or intermediate position, deenergizing the motor.

The rotation of the motor in either direction is taken advantage of in controlling an independent or relay circuit. In carrying out this feature I provide a worm-wheel 26 meshing with the worm 18 and carrying a pinion 27 meshing, in turn, with a gear 28 on a metallic drum 29 which has its periphery equipped with spaced strips or segments 30 of insulating material. Mounted upon and insulated from the shaft 31 of the drum is a collector ring 32 engaged by a spring or other contact 33 with which is connected one of the conductors 34 of an independent source of current. The drum 29 is likewise insulated from the shaft 31 but is in electrical connection with the ring 32. Cooperating with the drum 29 is a spring or other contact 35 with which is connected a wire 36 leading to a lever 37 pivoted at 38 and located between the electro-magnets 22 and 23. This lever carries an armature 39 positioned between and adapted to be attracted by the pole pieces 40 and 41 of the magnets 22 and 23, respectively. This lever 37 is normally maintained in an intermediate or neutral position by means of suitable springs 42 extending from opposite sides thereof. On the lever is a contact 43 located between and adapted to be brought into engagement with either of contacts 44 and 45.

The independent circuit above referred to further includes a pair of solenoids 46 and 47 which have one terminal connected by conductors 48 and 49 with the contacts 44 and 45, respectively. The other conductor 50 of the independent source of current, not shown, is connected with the remaining terminals of both solenoids 46 and 47. These solenoids include movably mounted cores 51 and 52 carrying contacts 53 and 54, respectively, the former of which is adapted to engage and bridge contacts 55 and 56, and the latter of which is adapted to engage and bridge contacts 57 and 58.

The numerals 59 and 60 designate the terminals of still another independent source of current and the former is connected with both contacts 56 and 57 while the latter is connected with one terminal of each of a pair of solenoids 61 and 62. The other terminal of the solenoid 61 is connected by a conductor 63 with the contact 55, and the remaining terminal of the solenoid 62 is connected by a conductor 64 with the contact 58. Positioned between the solenoids 61 and 62 is the shaft 65 of a drum device, indicated diagrammatically at 66, which drum carries contact segments 67 adapted to engage contacts 68 connected with any suitable electro-magnetically operated control devices for the burners or feed means of a furnace or the like constituting, forming part of, or operating the prime mover. This drum and the contacts associated therewith are shown in Figure 2 for illustrative purposes only as there is no limitation as to the exact type of circuit control mechanism operated by movement of the shaft 65. The drum disclosed is well adapted for use in connection with my fuel feeding mechanism disclosed in the above mentioned co-pending application. The shaft 65 carries a pair of ratchets or segmental ratchets 69 and 70, the teeth of which face oppositely, as shown. Suitably pivoted, as at 71, are levers 72 and 73 connected by links 74, or their equivalent, with the cores 75 and 76 of the solenoids 61 and 62. These levers carry spring-pressed pawls 77 and 78 arranged to have limited movement and positioned to cooperate with the ratchets 69 and 70.

Variations in the current flow through the main line produce corresponding variations in the strength of the electro-magnet 3 which will result in energization of the motor 15 in one direction or the other, as above explained. When the arm 6 is moved to engage either the contacts 8 or 9 with the contact 10 or 11, as the case may be, it is apparent that either the electro-magnet 22 or 23 will be energized and this will result in attraction of the armature 39 and consequent movement of the lever 37 so that the contact 43 thereon will be brought into engagement with either the contact 44 or the contact 45. Any continuous rotation of the armature of the motor 15 must result in rotation of the drum 29 and intermittent engagement of the contact 35 with the metallic surfaces of the drum between the insulating strips 30. As one conductor 34 of the independent source is connected with the contact 33, current will pass from this contact, through the ring 32, drum 29, and at such time intervals when the contact 35 is in engagement with the metallic surfaces of the drum 29, the current will pass through the contact 35 and conductor 36 to the lever 37 and contact 43 carried thereby and thence through either the conductor 48 or 49 to and through the solenoid 46 or 47, as the case may be, and thence through the conductor 50 back to the source. The intermittent flow of current caused by engagement of the contact 35 with the successive metallic areas of the drum between the strips 30 and during operation of the motor 15, consequently causes corresponding intermittent energization of the solenoid 46 or 47, whichever is in use, and this intermittent flux will be reflected in the intermittent bridging and unbridging of the contacts 55 and 56 or 57 and 58, the circuit controlled by or in which these contacts are located being consequently intermittently opened and closed.

Whenever the contacts 55 and 56 are bridged, the solenoid 61 will be energized and will attract the core 75 so that the lever 72 will be moved, the pawl 77 thereon engaging the ratchet 69 and rotating the drum 66 one step. When the contacts 57 and 58 are bridged, the solenoid 62 is energized so that the core 76 thereof will be moved and the lever 73 correspondingly moved so that the pawl 78 thereon operating with the ratchet 70 will rotate the drum 66 in a reverse direction. It is preferable that the insulating strips 30 be so arranged with respect to the ratchet teeth that whenever the contact 35 engages the drum between the successive strips, the ratchet 69 or 70, as the case may be, will be turned to a corresponding extent for rotating the drum 66 accordingly.

Obviously, the movement of such a control drum as that illustrated in Figure 2 may be utilized for controlling fuel for internal combustion engines, gas or oil burners, pulverized fuel feeders, motors or engines operating stokers or any other devices for controlling or regulating a furnace F with boiler producing steam for the operation of an engine E driving the generator G of the plant, the generator supplying current through the conductors 1 and 2, above mentioned. For purposes of illustration, the furnace F is here represented as equipped with a plurality of feed conduits C within which are interposed control devices which might be electro-magnetically operated valves V of any ordinary or preferred type. These valves are not illustrated in detail as they form no part of the present invention and while the word "valve" is used it should be understood that it is employed only in a broad sense as it may be construed to refer to a damper, regulator, or motor driven or other feed device for any kind of fuel. The contacts 68 are connected with the electromagnets or solenoids of the respective valves V, all of which have a common return conductor 79. The segments 67 are all connected with a conductor 80 and any suitable source of current may be provided for the conductors 79 and 80 for supplying the necessary power to effect operation of the valves. The segments 67 are shown as of progressively increasing lengths so that when the drum 66 is rotated properly, a greater or less number of the segments 67 will engage the contacts 68 for opening or closing a progressively increasing or decreasing number of the valves V in accordance with the rotation of the drum by the solenoid actuated pawl and ratchet mechanism above described.

Whenever there is any reduction in the current in the conductors 1 and 2, the magnetic pull exerted by the solenoid 3 is lessened and the spring 12 will operate to swing the arm 6 and bring the contact 9 into engagement with the contact 11, thus energizing the solenoid 23 while energizing the motor so that the armature thereof will run in such a direction that the drum 29 will so turn that the drum 66 rotated by the pawl and ratchet mechanism controlled by the solenoid devices, will reduce the number of segments 67 into engagement with the contacts 68, thus cutting down the number of open valves V and decreasing the amount of fuel fed to the furnace of the prime mover. Logically, this will result in decrease in the speed or power of the engine to correspond with the decrease in demand for electric power from generator G. The fuel feed is thus automatically decreased until the current in the conductors 1 and 2 is such that the magnetic pull of the solenoid 3 will balance the tension of the spring 12, whereupon the arm 6 will return to neutral position with the various control devices deenergized.

In case the current in the conductors 1 and 2 is increased due to additional load demand, the magnetic pull of the solenoid 3 is increased, whereupon the arm 6 is moved in the opposite direction for reversing the direction or rotation of the armature shaft and the direction of movement of the drum 29 so that the drum 66 rotated by the step by step pawl and ratchet mechanism, which is itself actuated as above described, will be such as to increase the number of segments 67 in engagement with the contacts 68, thereby cutting in the successive valves V in the furnace control mechanism corresponding to the magnitude of the increase in current flowing in circuit or bus-bars 1 and 2. In this way it will be apparent that the automatic regulation of and increase or decrease of amount of fuel necessary to meet varying load conditions in the power station bus-bars will be assured.

An advantageous feature possessed by a mechanism constructed and arranged as described and shown is that there is a positive step by step movement of the ultimate control drum owing to the intermittent energization of the circuit controlled by the drum driven by the motor. There is consequently a definite and sharp make or break of the circuit which insures proper action.

By the installation of an indicating hand 103 and graduated circular scale 104, as indicated on the shaft 65, the position of this hand will show at all times the approximate electrical load which is being carried in circuit or bus-bars 1 and 2, regardless of the distance apart of the location of magnet 3, motor 15 and its associated mechanical parts and the location of drum 66, shaft 65 and its mechanical and electrical parts and attachments.

Having now described my invention, I claim:

1. The combination with an electric power plant and current transmitting system, of steam producing means involving a plurality of fuel firing devices operable to increase or decrease the steam supply, a magnetic coil connected with the current transmitting system and responsive to fluctuations in electrical loads thereon, a switch operable by said coil, means for maintaining said switch in neutral position corresponding to normal working loads of the system, and means including a plurality of electrical circuits controlled by said switch for actuating the fuel firing devices.

2. The combination with an electrical power plant and current transmitting system, of steam producing means involving a plurality of fuel firing devices operable to increase or decrease the steam supply, a magnetic coil connected with the current transmitting system and responsive to fluctuations in electrical loads thereon, a switch operable by said magnetic coil adapted to close an electric circuit, means connected to the switch for resisting the normal magnetic pull of the coil, and means including a motor and movable contact members operated thereby for successively actuating the fuel firing devices.

3. The combination with an electric power plant and current transmitting system, of a prime mover including a plurality of fuel firing devices, electro-magnetic means connected with the transmitting system and responsive to fluctuations in loads thereon, a motor, a switch operable by said electro-magnetic means for energizing the motor to effect rotation of its armature in either direction, means normally maintaining the switch in neutral position with the motor deenergized, and means driven by the motor including movable contact members for successively actuating the fuel firing devices.

4. The combination with an electric power plant and current transmitting system, of a prime mover including a plurality of fuel firing devices, electro-magnetic means connected with the transmitting system and responsive to fluctuations in loads thereon, a motor, a switch operable by said electro-magnetic means for energizing the motor to effect rotation of its armature in either direction, means normally maintaining the switch in neutral position with the motor deenergized, means driven by the motor including movable contact members for successively actuating the fuel firing devices, and means operated by the motor and connected with the means normally holding the switch in neutral position whereby to overcome the action of said electro-magnetic means on the switch and restore the balance.

5. The combination with an electric power plant and current transmitting system, the plant including a current generator and a prime mover therefor, of a plurality of fuel firing devices for the prime mover, electro-magnetic means connected in the transmitting system and responsive to fluctuations in the load thereon, a motor, a switch operatively connected with said electro-magnetic means for controlling the energization of the motor to effect rotation of its armature in one direction or the other, spring means normally maintaining the switch in neutral position with the motor deenergized, a circuit closer mechanism operatively connected with and driven by the motor for actuating the fuel firing devices, and means driven by the motor and connected with said spring means for overcoming the pull of said electro-magnetic means for restoring the switch to neutral position.

6. The combination with an electric power plant and current transmitting system, of a plurality of electrically operated fuel feeding devices for the furnace of a prime mover, an electro-magnetically operated switch susceptible to variations in the load on the system, means normally maintaining the switch in an inoperative position, a motor, selectively closable circuits for the motor controlled by said switch for energizing the motor to effect rotation of its armature in one direction or the other, means connected with the motor whereby to return the switch to normal position subsequent to movement thereof to either circuit closing position, and circuit control mechanism driven by the motor for actuating said fuel feeding devices.

7. The combination with an electric power plant and current transmitting system, of a plurality of electrically operated fuel feeding devices for the furnace of a prime mover, an electro-magnetically operated switch susceptible to variations in the load on the system, means normally maintaining the switch in an inoperative position, a motor, selectively closable circuits for the motor controlled by said switch for energizing the motor to effect rotation of its armature in one direction or the other, means connected with the motor whereby to return the switch to normal position subsequent to movement thereof to either circuit closing position, and circuit control mechanism driven by the motor for actuating said fuel feeding devices including an independent circuit embodying electro-magnets connected in said first named circuits, and a switch operated by said last named electro-magnets.

8. The combination with an electric power plant and current conducting system, the plant including a generator, a steam operated power device for driving the generator, and a furnace having a plurality of electrically operated fuel feeding devices, of electro-magnetic means connected in the system, a motor, a control switch connected with said electro-magnetic means for energizing the motor to effect rotation of its armature in one direction or the other in accordance with increase or decrease in the pull of said electro-magnetic means responsive to fluctuations in the load imposed on the system, means mechanically connecting the motor and said switch for returning the latter to neutral position subsequent to energization of the motor whereby to deenergize the motor, a movable contact mechanism connected with the fuel feeding devices for energizing the same, electro-magnetically operated means for moving said contact mechanism, a circuit for said last named electro-magnetic means, an independent circuit including electro-magnetically operated circuit closers interposed in said last named circuit, and means driven by the motor for intermittently opening and closing said independent circuit.

9. The combination with an electric power plant and current conducting system, of a prime mover for the generator of the plant involving a plurality of electrically operated fuel feeding devices, of electro-magnetic means connected in the system and responsive to variations in the load imposed thereon, a motor, a switch operatively connected with the electro-magnetic means for controlling energization of motor, an independent circuit including an electro-magnetically operated switch controlled by the motor circuit, a second independent circuit controlled by said second named switch, movable contact mechanism controlled by energization of said first named independent circuit, and means driven by the motor for intermittently closing the circuit through said second named switch.

10. The combination with an electric power plant and current conducting system, of a prime mover for the generator of the plant involving a plurality of electrically operated fuel feeding devices, of electro-magnetic means connected in the system and responsive to variations in the load imposed thereon, a motor, a switch operatively connected with the electro-magnetic means for controlling energization of the motor, an independent circuit including an electro-magnetically operated switch controlled by the motor circuit, a second independent circuit controlled by said second named switch, movable contact mechanism controlled by energization of said first named independent circuit, means driven by the motor for intermittently closing the circuit through said second named switch, and mechanical means driven by the motor for counter-acting the pull of said first named electro-magnetic means.

11. In a control apparatus for the prime mover of an electric power plant including a generator, driving means therefor, and a plurality of electrically operated fuel feeding devices in association with the driving means; an electro-magnetic switch in circuit with the generator output and responsive to variations in the load, a motor in circuit with and controlled by said switch, electro-magnetic means interposed in the motor circuit, an independent circuit, switch means for the independent circuit responsive to energization of said second named electro-magnetic means, and electro-magnetically operated circuit closer means connected with the fuel feeding devices and controlled by energization of the independent circuit.

12. In a control apparatus for the prime mover of an electric power plant including a generator, driving means therefor, and a plurality of electrically operated fuel feeding devices in association with the driving means; an electro-magnetic switch in circuit with the generator output, and responsive to variations in the load, a motor in circuit with and controlled by said switch, electro-magnetic means interposed in the motor circuit, an independent circuit, switch means in the independent circuit responsive to energization of said second named electro-magnetic means, electro-magnetically operated circuit closer means connected with the fuel feeding devices and controlled by energization of the independent circuit, and a circuit controller driven by the motor interposed in said independent circuit for intermittently opening and closing the same.

13. The combination with the prime mover and generator of a power plant, of a plurality of electrically operated control devices for the prime mover, electro-magnetic means connected with the generator output and susceptible to variations in the load, a switch connected with said electro-magnetic means, a motor in circuit with said switch movable contact mechanism connected with said prime mover control device, electro-magnetically operated means for moving said mechanism step by step, an independent circuit for controlling the actuation of said last named electro-magnetic means, electro-magnetic means interposed in the motor circuit for controlling the independent circuit, and a rotary contact making and breaking device driven by the motor and interposed in said independent circuit for permitting intermittent flow of current therethrough.

14. The combination with the prime mover and generator of a power plant, of a plurality of electrically operated control devices for the prime mover, electro-magnetic means connected with the generator output and susceptible to variations in the load, a switch connected with said electro-magnetic means, a motor in circuit with said switch, movable contact mechanism connected with said prime mover control devices, electro-magnetically operated means for moving said mechanism step by step, an independent circuit for controlling the actuation of said last named electro-magnetic means, electro-magnetic means interposed in the motor circuit for controlling the independent circuit, a rotary contact making and breaking device driven by the motor and interposed in said independent circuit for permitting intermittent flow of current therethrough, and a mechanical drive connection between the motor and the switch for restoring the same to neutral position subsequent to operation of the motor.

15. The combination with an electric power plant and current transmitting system, of steam producing means involving a plurality of fuel firing devices operable to increase or decrease the steam supply, a magnetic coil connected with the current transmitting system and responsive to fluctuations in electrical loads thereon, a switch operable by said coil, and means including a plurality of electrical circuits controlled by said switch for actuating the fuel firing devices.

16. The combination with an electric power plant and current transmitting system, of steam producing means involving a plurality of fuel firing devices operable to increase or decrease the steam supply, a magnetic coil connected with the current transmitting system and responsive to fluctuations in electrical loads thereon, a plurality of electrical circuits for actuating the fuel firing devices, and means controlled by said magnetic coil for energizing or deenergizing said plurality of circuits sequentially.

17. The combination with an electric power plant and current transmitting system, of steam producing means involving a plurality of fuel firing devices operable to increase or decrease the steam supply, a coil connected in the current transmitting system and responsive to fluctuations in electrical loads thereon, and means including a rotary distributor and a plurality of electrical circuits controlled thereby for actuating the fuel firing devices, said means being under the control of said coil.

18. The combination with an electric power plant and current transmitting system, of steam producing means involving a plurality of fuel firing devices operable to increase or decrease the steam supply, magnetic means connected in the current transmitting system and responsive to fluctuations in electrical loads thereon, a plurality of electrical circuits for the respective fuel firing devices, distributor means for controlling the flow of current to said plurality of circuits, and means controlled by said magnetic means for controlling said distributor means.

In testimony whereof I affix my signature.

CHARLES H. QUINN.